(12) United States Patent
Yamashita et al.

(10) Patent No.: US 10,854,353 B2
(45) Date of Patent: Dec. 1, 2020

(54) CABLE WITH TERMINAL FORMED THEREIN AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Takuya Yamashita, Yokkaichi (JP); Tetsuya Nakamura, Yokkaichi (JP); Yoshiaki Yamano, Yokkaichi (JP); Junichi Ono, Yokkaichi (JP); Takaaki Ito, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/757,049

(22) PCT Filed: Oct. 18, 2018

(86) PCT No.: PCT/JP2018/038777
§ 371 (c)(1),
(2) Date: Apr. 17, 2020

(87) PCT Pub. No.: WO2019/082782
PCT Pub. Date: May 2, 2019

(65) Prior Publication Data
US 2020/0343017 A1    Oct. 29, 2020

(30) Foreign Application Priority Data
Oct. 25, 2017   (JP) .................. 2017-205926

(51) Int. Cl.
*H01B 7/00* (2006.01)
*H01R 4/18* (2006.01)
(Continued)

(52) U.S. Cl.
CPC ............. *H01B 7/0045* (2013.01); *H01R 4/18* (2013.01); *H01R 4/62* (2013.01); *H01R 4/70* (2013.01); *B60R 16/0207* (2013.01)

(58) Field of Classification Search
CPC .......... H01B 7/0045; H01R 4/18; H01R 4/62; H01R 4/70; B60R 16/0207
(Continued)

(56) References Cited

U.S. PATENT DOCUMENTS

| 2012/0199391 A1 | 8/2012 | Inoue et al. | |
| 2013/0098679 A1* | 4/2013 | Takata | C23F 11/173 174/74 R |

(Continued)

FOREIGN PATENT DOCUMENTS

| JP | 2012-089431 A | 5/2012 |
| JP | 2012-174447 A | 9/2012 |

(Continued)

OTHER PUBLICATIONS

Dec. 25, 2018 International Search Report issued in International Patent Application No. PCT/JP2018/038777.

*Primary Examiner* — Sherman Ng
(74) *Attorney, Agent, or Firm* — Oliff PLC

(57) ABSTRACT

A terminal-equipped electrical wire that includes a terminal fitting; an electrical wire that includes a conductor surrounded by an insulation covering and is electrically connected to the terminal fitting in an electrical connection; and a resin cover that is made of a resin material and covers the electrical connection, wherein the resin cover is in contact with the terminal fitting and the insulation covering, a tensile (Continued)

shear adhesion strength between the resin cover and the terminal fitting is 1.0 MPa or higher, and a tensile shear adhesion strength between the resin cover and the insulation covering is 0.5 MPa or higher.

6 Claims, 4 Drawing Sheets

(51) Int. Cl.
     *H01R 4/70*      (2006.01)
     *H01R 4/62*      (2006.01)
     *B60R 16/02*     (2006.01)

(58) Field of Classification Search
    USPC .................................................... 174/72 A
    See application file for complete search history.

(56) References Cited

U.S. PATENT DOCUMENTS

| | | |
|---|---|---|
| 2013/0199842 A1 | 8/2013 | Inoue et al. |
| 2013/0292173 A1 | 11/2013 | Inoue et al. |
| 2015/0047900 A1* | 2/2015 | Suetani ............... H02G 15/046 174/77 R |
| 2019/0214744 A1 | 7/2019 | Yamashita |

FOREIGN PATENT DOCUMENTS

| | | |
|---|---|---|
| JP | 2012-174449 A | 9/2012 |
| JP | 2012-195137 A | 10/2012 |
| JP | 2016-0164890 A | 9/2016 |
| WO | 2013/132929 A1 | 9/2013 |

* cited by examiner

500nm

100nm

CABLE WITH TERMINAL FORMED THEREIN AND WIRE HARNESS

BACKGROUND

The present disclosure relates to a terminal-equipped electrical wire and a wire harness, and more specifically relates to a terminal-equipped electrical wire that has a resin cover portion for corrosion prevention provided on an electrical connection portion for connecting a conductor and a terminal fitting, and to a wire harness that employs the terminal-equipped electrical wire.

In an electrical wire for being routed in a vehicle such as an automobile, a terminal fitting is connected to a conductor at the end of the electrical wire. There is desire to prevent corrosion at the electrical connection portion where the terminal fitting and the conductor of the electrical wire are electrically connected to each other. Particularly in the case where different metal materials are in contact with each other in the electrical connection portion, it is possible for dissimilar metal corrosion to occur. In order to achieve vehicle weight reduction and the like, the conductor in electrical wires for use in vehicles is sometimes made of aluminum or an aluminum alloy. However, the terminal fitting is often made of copper or a copper alloy, and also plated with tin or the like. In this case, the problem of dissimilar metal corrosion can easily occur at the electrical connection portion where the aluminum-based metal comes into contact with the copper-based material or tin plating layer. For this reason, there is desire to reliably prevent corrosion of the electrical connection portion.

Covering the electrical connection portion with a resin material is a known method for preventing corrosion of the electrical connection portion. For example, JP 2011-103266A discloses a terminal-equipped covered wire having an electrical connection portion for connecting a terminal fitting and an electrical wire conductor, and discloses that a main component of a corrosion prevention material that covers the electrical connection portion is a thermoplastic polyamide resin and has an aluminum overlap tensile shear strength, a coefficient of elongation, and a coefficient of water absorption that are in predetermined ranges.

Also, as another aspect for preventing corrosion of the electrical connection portion, JP 2016-164890A discloses a configuration in which a crimped terminal is provided with a water-stop member at a predetermined position on the inner surface of a crimp portion that is to be crimped to the exposed portion of an electrical wire conductor. When this crimped terminal is connected to the aluminum core wire of an electrical wire, a gap between the crimp portion and the aluminum core wire is sealed by the water-stop member that is arranged on the inner circumferential surface of the crimp portion.

SUMMARY

When a terminal-equipped electrical wire is used in a vehicle such as an automobile, the terminal-equipped electrical wire is likely to be subjected to changes in temperature. Particularly in the case where the terminal-equipped electrical wire is routed at a location such as an engine room, the terminal-equipped electrical wire is subjected to large and frequent changes in temperature. In recent years, in order to achieve weight reduction for automobiles, terminal-equipped electrical wires having a conductor made of aluminum or an aluminum alloy have been used around the engine. Given that the engine room is an outside environment, the terminal-equipped electrical wire is sometimes exposed to a low-temperature environment such as the air during winter or the like, and is sometimes exposed to a high-temperature environment when the engine becomes hot due to running for a long time. In this way, a terminal-equipped electrical wire routed in an engine room or the like is likely to be subjected to temperature cycles of alternating low-temperature environments and high-temperature environments.

In cases where the electrical connection portion of an terminal-equipped electrical wire is covered by a corrosion prevention material made of a resin as described in JP 2011-103266A, it is common for the resin material that makes up the insulation covering of the electrical wire, the metal material that makes up the terminal fitting, and the resin material that makes up the corrosion prevention material to expand and contract in different ways in response to changes in temperature. When such materials that expand and contract in different ways in response to changes in temperature are adhered to each other, and the terminal-equipped electrical wire is subjected to temperature cycles, detachment stress is generated at the adhesion interfaces. Accordingly, there are cases where detachment occurs at the interface between the corrosion prevention material and the insulation covering, and at the interface between the corrosion prevention material and the terminal fitting. Accordingly, it is likely that a corrosion factor will intrude into the region covered by the corrosion prevention material through a gap formed in the interface due to detachment, and that corrosion will occur when the corrosion factor comes into contact with the electrical connection portion. In such a case, it is difficult to maintain the corrosion resistance of the corrosion prevention material over an extended period of time. The corrosion prevention material used in JP 2011-103266A has a specified aluminum overlap tensile shear strength, but even if the material has a high adhesion with aluminum, it is not necessarily the case that the adhesion to the surface of the insulation covering and the terminal fitting is sufficiently strong enough to prevent detachment when the electrical wire is subjected to temperature cycles.

When using a structure for sealing an electrical wire conductor by providing a corrosion prevention material layer on the inner surface of the crimp portion of a terminal fitting as described in JP 2016-164890A, the corrosion resistance is not likely to decrease even when the crimp portion is subjected to temperature cycles. However, when forming a terminal fitting that has a special structure in which the corrosion prevention material is arranged on the inner surface, it is not possible to employ the same design as a conventional general terminal fitting not provided with a corrosion prevention material, and therefore the terminal fitting has a lower versatility, and the economic efficiency is also lower in terms of the structure of the terminal fitting.

An exemplary aspect of the disclosure provides a terminal-equipped electrical wire and a wire harness in which the electrical connection portion for connecting the terminal fitting to the electrical wire is covered by a resin cover portion, and in which detachment caused by temperature cycles can be suppressed at the interface between the terminal fitting and the resin cover portion and the interface between the insulation covering and the resin cover portion, without using a special structure.

A terminal-equipped electrical wire according to the present disclosure includes: a terminal fitting; an electrical wire that includes a conductor surrounded by an insulation covering and is electrically connected to the terminal fitting in an electrical connection; and a resin cover that is made of a resin material and covers the electrical connection, wherein the resin cover is in contact with the terminal fitting and the insulation covering, a tensile shear adhesion strength between the resin cover and the terminal fitting is 1.0 MPa or higher, and a tensile shear adhesion strength between the resin cover and the insulation covering is 0.5 MPa or higher.

Here, it is preferable that fusion has occurred at an interface between the resin cover and the insulation covering.

Also, it is preferable that the resin cover includes a first cover layer that is provided in contact with a surface of the terminal fitting, and a second cover layer that is provided in contact with the first cover layer and the insulation covering, and a tensile shear adhesion strength between the first cover layer and the terminal fitting is 1.0 MPa or higher, a tensile shear adhesion strength between the second cover layer and the insulation covering is 0.5 MPa or higher, and a tensile shear adhesion strength between the first cover layer and the second cover layer is 1.0 MPa or higher.

In this case, it is preferable that a resin material that forms the second cover layer has a higher melting point than a resin material that forms the first cover layer. Also, it is preferable that fusion has occurred at an interface between the first cover layer and the second cover layer.

It is preferable that the first cover layer contains at least one of a polyester elastomer and a polyurethane elastomer. It is preferable that the second cover layer contains at least one of a polyester resin, a polycarbonate resin, and a polyphenylene sulfide resin.

A wire harness according to the present disclosure has the above-described terminal-equipped electrical wire.

In the terminal-equipped electrical wire according to an above-described aspect of the disclosure, the tensile shear adhesion strength between the resin cover and the terminal fitting is 1.0 MPa or higher, and the tensile shear adhesion strength between the resin cover and the insulation covering of the electrical wire is 0.5 MPa or higher. In this way, the resin cover has a high adhesion with both the terminal fitting and the insulation covering, and therefore even when the terminal-equipped electrical wire is subjected to temperature cycles, sufficient adhesion is likely to be maintained at the interface between the resin cover and the terminal fitting and the interface between the resin cover and the insulation covering, and detachment is not likely to occur at the interface between the resin cover and the terminal fitting and the interface between the resin cover and the insulation covering even if the constituent materials thereof expand and contract in different ways in response to temperature changes. As a result, even if the terminal-equipped electrical wire is used in an environment that is subjected to temperature cycles, the corrosion resistance of the resin cover is likely to be maintained over an extended period of time. The suppression of detachment of the resin cover is achieved through the properties of the material that constitutes the resin cover, and does not require a special structure.

Here, if fusion has occurred at the interface between the resin cover and the insulation covering, the adhesion of the resin cover to the insulation covering is likely to increase due to the fusion. As a result, a reduction in corrosion resistance at the interface between the insulation covering and the resin cover caused by temperature cycles is particularly likely to be suppressed.

Also, the resin cover has the first cover layer that is provided in contact with the surface of the terminal fitting and also has the second cover layer that is provided in contact with the first cover layer and the insulation covering, the tensile shear adhesion strength between the first cover layer and the terminal fitting is 1.0 MPa or higher, the tensile shear adhesion strength between the second cover layer and the insulation covering is 0.5 MPa or higher, and the tensile shear adhesion strength between the first cover layer and the second cover layer is 1.0 MPa or higher, and in this case, by selecting materials that have a high adhesion with the terminal fitting and the resin cover as the constituent materials of the first cover layer and the second cover layer respectively, the overall resin cover, which has a composite structure including the first cover layer and the second cover layer, is likely to ensure a high adhesion with both the terminal fitting and the resin cover. Moreover, the adhesion between the first cover layer and the second cover layer is also high, thus suppressing corrosion of the electrical connection caused by the intrusion of a corrosion factor through the interface between the first cover layer and the second cover layer, and making it likely to ensure high corrosion resistance for the resin cover overall. Furthermore, the corrosion resistance is likely to be maintained even after temperature cycles.

In this case, the resin material that constitutes the second cover layer has a higher melting point than the resin material that constitutes the first cover layer, and therefore after the first cover layer has been formed, when the second cover layer is formed by a melted resin material that comes into contact with the first cover layer, the surface layer portion of the first cover layer melts due to the heat of the melted resin material. When the melted portion then hardens, an interface having a high adhesion strength is likely to be formed between the first cover layer and the second cover layer.

Also, if fusion has occurred at the interface between the first cover layer and the second cover layer, the adhesion between the first cover layer and the second cover layer increases due to the fusion, and a decrease in corrosion resistance caused by detachment at the interface between the first cover layer and the second cover layer is particularly likely to be suppressed.

If the first cover layer contains at least one of a polyester elastomer and a polyurethane elastomer, it is likely to exhibit a high adhesion with the surface of the metal material that constitutes the terminal fitting, such as a tin-plated copper alloy.

If the second cover layer contains at least one of a polyester resin, a polycarbonate resin, and a polyphenylene sulfide resin, it is likely to exhibit a high adhesion with the surface of the resin material that constitutes the insulation covering, such as polyvinyl chloride or polypropylene. If the first cover layer is constituted by a polyester elastomer or a polyurethane elastomer, the second cover layer constituted by any of the aforementioned resin materials is likely to exhibit a high adhesion with the first cover layer as well.

The wire harness according to an aspect of the disclosure includes the terminal-equipped electrical wire according to any of the above aspects, and therefore even without using a special structure, detachment is not likely to occur at the interface between the resin cover and the terminal fitting and the interface between the resin cover and the insulation covering of the electrical wire when subjected to temperature cycles, and the corrosion resistance of the resin cover is likely to be maintained over an extend period of time.

BRIEF DESCRIPTION OF THE DRAWINGS

FIG. 3A shows an observation image at 8,000 magnification and FIG. 3B shows an observation image at 40,000 magnification.

FIG. 4A shows an observation image at 8,000 magnification and FIG. 4B shows an observation image at 40,000 magnification.

DETAILED DESCRIPTION OF EMBODIMENTS

Figure 1:
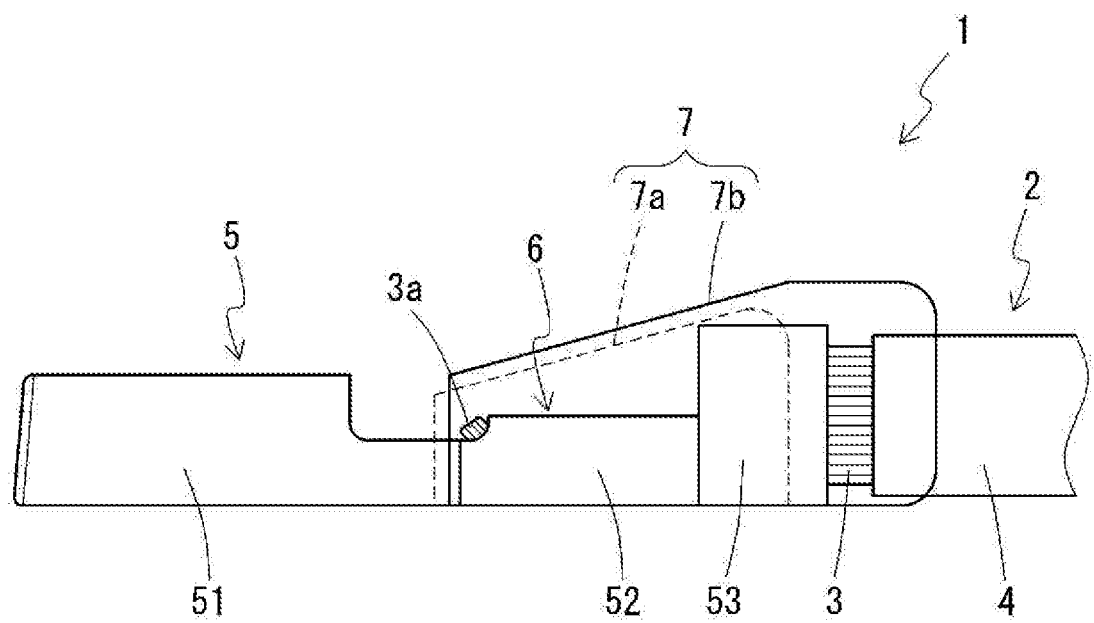
FIG. 1 is a perspective side view of a terminal-equipped electrical wire according to an embodiment of the present disclosure. A first cover layer of a resin cover portion is shown using a dashed line.

Embodiments of the present disclosure will be described in detail below with reference to the drawings.

Terminal-Equipped Electrical Wire

1. Overall Configuration

First, the overall configuration of a terminal-equipped electrical wire 1 according to an embodiment of the present disclosure will be described with reference to FIGS. 1 and 2. In the terminal-equipped electrical wire 1 according to this embodiment of the present disclosure, a conductor 3 is electrically connected to an electrical wire 2, which is covered by an insulation covering 4, and to a terminal fitting 5 by an electrical connection portion 6 (electrical connection). A resin cover portion 7 (resin cover) made of a resin material is formed so as to cover a portion that includes the electrical connection portion 6. In the present specification, with respect to the lengthwise direction of the terminal-equipped electrical wire 1, the side on which the terminal fitting 5 is arranged will be called the front side, and the side on which the electrical wire 2 is arranged will be called the rear side.

The terminal fitting 5 has a connection portion 51. A barrel portion is integrated with and extends from the rear end side of the connection portion 51, and is constituted by a first barrel portion 52 and a second barrel portion 53. The connection portion 51 is configured as a box-type fitting connection portion of a female fitting terminal, and can be fitted together with a male connection terminal (not shown).

In the electrical connection portion 6, the insulation covering 4 is removed from the end of the electrical wire 2 to expose the conductor 3. This end portion of the electrical wire 2 including the exposed conductor 3 is fixed by being crimped on one side (the upper surface side in FIG. 1) by the barrel portions 52 and 53 of the terminal fitting 5, thus connecting the electrical wire 2 and the terminal fitting 5 to each other. Specifically, the first barrel portion 52 electrically connects the conductor 3 and the terminal fitting 5, and also physically fixes the conductor 3 to the terminal fitting 5. On the other hand, at a location rearward of the first barrel portion 52, the second barrel portion 53 fixes the electrical wire 2 more weakly than the first barrel portion 52 fixes the conductor 3, thus assisting the physical fixing of the electrical wire 2 to the terminal fitting 5. Even in the case of being crimped to and fixing a rearward portion of the exposed conductor 3 at the end of the electrical wire 2, the second barrel portion 53 may fix the electrical wire 2 at a further rearward location by being crimped around the insulation covering 4 that covers the conductor 3, but in the embodiments shown in the figures, the second barrel portion 53 is crimped to and fixes the exposed conductor 3.

With respect to the lengthwise direction of the terminal-equipped electrical wire 1, the resin cover portion 7 is formed over a region that extends from a position forward of a leading end 3a of the exposed conductor 3 at the end of the electrical wire 2 to a position rearward of the leading end of the insulation covering 4 of the electrical wire 2, thus covering the entirety of the electrical connection portion 6 and a portion of the end side of the insulation covering 4 of the electrical wire 2. The leading end portion 3a of the conductor 3, which is exposed at the end of the electrical wire 2, is also completely covered by the resin cover portion 7 so as to not be exposed to the outside. With respect to the circumferential direction of the terminal-equipped electrical wire 1, the resin cover portion 7 covers all of the surfaces other than the bottom surface (the lower surface in FIG. 1 on the side opposite to the side where the conductor 3 is fixed) at the position of the terminal fitting 5. At the position of the electrical wire 2, the resin cover portion 7 covers the entire circumference of the electrical wire 2.

The terminal-equipped electrical wire 1 can be used as a connector by inserting the terminal fitting 5 portion, which includes the electrical connection portion 6, into a hollow connector housing (not shown) that is made of a resin material such as polybutylene terephthalate (PBT) or the like. Not providing the resin cover portion 7 on the bottom surface of the terminal fitting 5 as described above facilitates insertion into the hollow portion of a small connector housing, but the resin cover portion 7 may be provided on the bottom surface of the terminal fitting 5 if the hollow portion is sufficiently large for example.

2. Configurations of Members

The following describes the specific configurations of the electrical wire 2, the terminal fitting 5, and the resin cover portion 7 that constitute the terminal-equipped electrical wire 1.

(1) Electrical Wire

The conductor 3 of the electrical wire 2 may be constituted by a single metal strand, but is preferably made up of a stranded wire in which multiple strands are twisted together. In this case, the stranded wire may be constituted by one type of metal strand, or may be constituted by two or more types of metal strands. Also, besides metal strands, the stranded wire may also include organic fiber strands or the like. The stranded wire may also include reinforcement wires (tension members) for reinforcing the electrical wire 2, for example.

Examples of the material making up the metal strands that constitute the conductor 3 include copper, a copper alloy, aluminum, an aluminum alloy, or a material obtained by providing various types of plating on such materials. Also, in the case where metal strands serve as reinforcement wires, examples of constituent materials include a copper alloy, titanium, tungsten, and stainless steel. Moreover, in the case where organic fivers serve as reinforcement wires, one example of the constituent material is Kevlar.

The insulation covering 4 can be made up of a material such as rubber, a polyolefin such as polypropylene (PP), a halogen polymer such as polyvinylchloride (PVC), or a thermoplastic elastomer. Such materials may be used on their own, or two or more may be used in combination with each other. Various types of additives may be added to the material constituting the insulation covering 4, as necessary. Examples of such additives include a flame retardant, a filler, and a colorant.

(2) Terminal Fitting

Examples of the material (base material) constituting the terminal fitting 5 include generally-used brass, as well as copper and various types of copper alloys. The entirety of the surface of the terminal fitting 5 or a portion thereof (e.g., contacts) may be plated with various types of metals such as tin, nickel, gold, or alloys thereof.

As described above, the conductor 3 and the terminal fitting 5 may be made up of all sorts of metal materials, but if different materials are in contact with each other in the electrical connection portion 6 (as in the case where the terminal fitting 5 is made up of a general terminal material obtained by plating a copper or copper alloy base material with tin, and the conductor 3 includes strands made up of aluminum or an aluminum alloy), corrosion in particular is likely to occur in the electrical connection portion 6 due to contact with a corrosion factor such as moisture. However, by covering the electrical connection portion 6 with the resin cover portion 7 as will be described next, it is possible to suppress such dissimilar metal corrosion.

(3) Resin Cover Portion

As described above, the resin cover portion 7 covers the electrical connection portion 6 between the terminal fitting 5 and the conductor 3, thus preventing the intrusion of a corrosion factor such as water into the electrical connection portion 6. Accordingly, the resin cover portion 7 plays a role of preventing corrosion of the electrical connection portion 6 caused by a corrosion factor.

Figure 2:
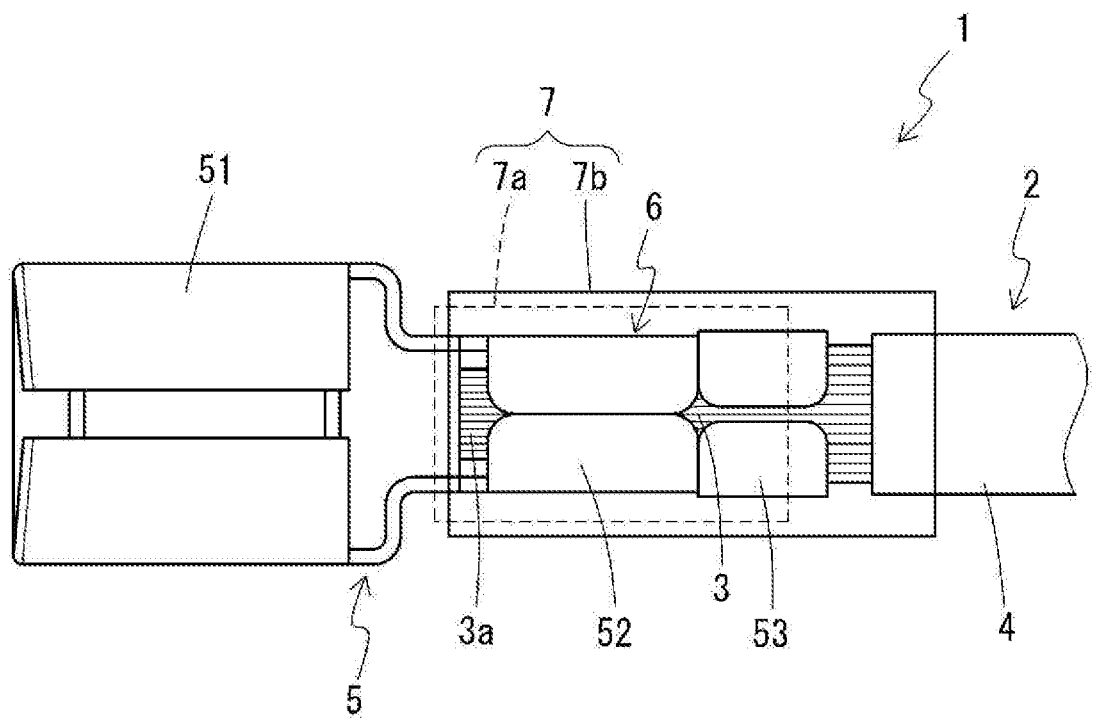
FIG. 2 is a perspective plan view of the terminal-equipped electrical wire.

As shown in FIGS. 1 and 2, in the front portion, the resin cover portion 7 is in contact with the terminal fitting 5, and in the rear portion, the resin cover portion 7 is in contact with the insulation covering 4 of the electrical wire 2 and covers a region that includes the electrical connection portion 6. In the aspect shown in FIGS. 1 and 2, as will be described in detail later, the resin cover portion 7 is constituted by two layers, namely a first cover layer 7a and a second cover layer 7b, but is not limited to this aspect, and as long as the resin cover portion 7 overall has the below-described adhesive properties with the terminal fitting 5 and the insulation covering 4, it may be constituted by one layer or two or more layers.

In the portions of the resin cover portion 7 that come into contact with the terminal fitting 5 and the insulation covering 4, the resin cover portion 7 has a predetermined adhesion strength with respect to the terminal fitting 5 and the insulation covering 4. Specifically, the tensile shear adhesion strength between the resin cover portion 7 and the terminal fitting 5 is 1.0 MPa or higher, and the tensile shear adhesion strength between the resin cover portion 7 and the insulation covering 4 is 0.5 MPa or higher.

Note that the tensile shear adhesion strength (hereinafter, sometimes simply called adhesion strength) between constituent materials of the terminal-equipped electrical wire 1 can be measured by performing a tensile adhesion test at room temperature in compliance with JIS K 6850. Also, in the present specification, the values recited as the adhesion strengths between constituent materials of the terminal-equipped electrical wire 1 are values obtained through a phenomenon such as fusion (welding) that occurs in a process for manufacturing the resin cover portion 7 such as injection molding, and it is preferable that the shear adhesion test is also performed on a sample produced under conditions that reflect that manufacturing process.

Due to the adhesion strength between the resin cover portion 7 and the terminal fitting 5 being 1.0 MPa or higher, and the adhesion strength between the resin cover portion 7 and the insulation covering 4 being 0.5 MPa or higher, strong adhesion is achieved at the interface between the resin cover portion 7 and the terminal fitting 5 and at the interface between the resin cover portion 7 and the insulation covering 4. Accordingly, a corrosion factor cannot easily intrude into the region covered by the resin cover portion 7 from the terminal fitting 5 side or from the electrical wire 2 side, and it is possible to suppress corrosion such as dissimilar metal corrosion in the electrical connection portion 6. As a result, high corrosion resistance is achieved by the resin cover portion 7. Also, even if the terminal-equipped electrical wire 1 is subjected to temperature cycles, it is possible to maintain the high corrosion resistance.

When the terminal-equipped electrical wire 1 is subjected to temperature cycles, that is to say, repeatedly subjected to a high-temperature environment and a low-temperature environment, expansion and contraction repeatedly occur in the terminal fitting 5, the insulation covering 4, and the resin cover portion 7. The resin material that constitutes the resin cover portion 7, the metal material that constitutes the terminal fitting 5, and the resin material that constitutes the insulation covering 4 thus expand and contract in different ways in response to the changes in temperature, and therefore detachment stress is generated at the interface between the resin cover portion 7 and the terminal fitting 5 and at the interface between the resin cover portion 7 and the insulation covering 4. Given that the adhesion strength that the resin cover portion 7 has with the terminal fitting 5 and the insulation covering 4 is high as described above, even if detachment stress is generated at the interfaces due to differences between the expansion and contraction of the materials due to changes in temperature, the strong adhesion force of the resin cover portion 7 can suppress the case where detachment occurs at the interfaces. As a result, even if the terminal-equipped electrical wire 1 is subjected to temperature cycles, a gap that allows the intrusion of a corrosion factor is not likely to be formed between the resin cover portion 7 and the terminal fitting 5 or between the resin cover portion 7 and the electrical wire 2, and the corrosion resistance of the resin cover portion 7 can be maintained over an extended period of time. Accordingly, the terminal-equipped electrical wire 1 can be favorably used in an environment that is likely to be subjected to temperature cycles and requires corrosion resistance over an extended period of time, such as in a vehicle-mounted environment, and particularly in an environment in which temperature changes are large and frequent, such as in an engine room.

If the adhesion strength between the resin cover portion 7 and the insulation covering 4 is 0.5 MPa or higher as described above, various combinations of types of resin envisioned for use in the resin cover portion 7 and the insulation covering 4 can be used to effectively suppress detachment at the interfaces caused by differences in expansion and contraction in response to temperature changes. Particularly from the viewpoint of reliably suppressing detachment, it is preferable that the ratio of the expansion coefficients of the resin cover portion 7 and the insulation covering 4 is set such that the expansion coefficient of one of them is a factor of 3 times or less of the expansion coefficient of the other one.

From the viewpoint of particularly effectively maintaining corrosion resistance when subjected to temperature cycles, the adhesion strength between the resin cover portion 7 and the terminal fitting 5 is preferably 1.5 MPa or higher, and particularly preferably 1.8 MPa or higher. Also, the adhesion strength between the resin cover portion 7 and the insulation covering 4 is particularly preferably 0.7 MPa or higher.

Also, it is preferable that the adhesion strength between the resin cover portion 7 and the terminal fitting 5 is higher than the adhesion strength between the resin cover portion 7 and the insulation covering 4. This is because the resin cover portion 7 and the insulation covering 4 are both made of resin materials, and often the expansion and contraction thereof in response to temperature changes is not very different between them, but the expansion and contraction of the metal terminal fitting 5 is often very different from the resin cover portion 7, and in order to resist detachment stress that is generated over temperature cycles due to differences in expansion and contraction at the interface between the resin cover portion 7 and the terminal fitting 5, the adhesion strength needs to be higher at the interface between the resin cover portion 7 and the terminal fitting 5 than at the interface between the resin cover portion 7 and the insulation covering 4. It is sufficient that the adhesion strength between the resin cover portion 7 and the insulation covering 4 is 0.5 MPa or higher, but the adhesion strength between the resin cover portion 7 and the terminal fitting 5 needs to be 1.0 MPa or higher, and the reason for this is the same. For example, as one preferred aspect, the adhesion strength between the resin cover portion 7 and the terminal fitting 5 is a factor of 1.3 or higher, or further 2.0 or higher, of the adhesion strength between the resin cover portion 7 and the insulation covering 4.

The adhesion strength between the resin cover portion 7 and the insulation covering 4 tends to rise when fusion (welding) occurs between the resin cover portion 7 and the insulation covering 4. Fusion refers to a state in which the resin material that constitutes the resin cover portion 7 and the resin material that constitutes the insulation covering 4 both melt at the interface, diffuse into each other, and then harden, and a fused layer (adhered layer) is formed at the interface of the resin cover portion 7 and the insulation covering 4 due to the mixing of the resin material with each other or a chemical reaction between them. As will be described in a following embodiment with reference to FIG. 3, the thickness of the fused layer is normally on the order of nanometers to submicrons. Also, the fused layer is likely to be formed as an interface layer that has a smooth relief structure with a relief height on the order of nanometers to submicrons. When the fused layer is formed, the resin cover portion 7 and the insulation covering 4 are strongly adhered together via the fused layer. For example, when the resin cover portion 7 is formed by injection molding or the like, the fused layer can be formed by heating the resin for forming the resin cover portion 7 to a temperature that is at or above the melting point of the insulation covering 4, and then bring it into contact with the surface of the insulation covering 4.

Also, the adhesion strength between the resin cover portion 7 and the terminal fitting 5 is likely to increase if there is an interaction between the surfaces of the resin cover portion 7 and the terminal fitting 5, such as the formation of a chemical bond between a hydroxyl group present at the surface of the metal material that makes up the terminal fitting 5 and a functional group contained in the resin cover portion 7. Examples of functional groups that can have an interaction (e.g., chemical bond formation) with a hydroxyl group at the surface of the terminal fitting 5 include polar functional groups such as an ester group, an amide group, a hydroxyl group, an amino group, and a carboxyl group.

Detachment of the resin cover portion 7 caused by temperature cycles is not prevented by a special structure of the resin cover portion 7, but rather is prevented by constituent material properties, and therefore the resin cover portion 7 is not particularly limited in terms of specific shape, as long as it exhibits a predetermined adhesion strength with the terminal fitting 5 and the insulation covering 4. For example, the resin cover portion 7 may be constituted by multiple layers stacked in the thickness direction as described above, or may be constituted by multiple portions in the lengthwise direction. As one example of an aspect in which the resin cover portion 7 is configured to have a predetermined adhesion strength with both the terminal fitting 5 and the insulation covering 4, the following describes in detail an aspect in which the resin cover portion 7 is constituted by two layers, namely the first cover layer 7a and the second cover layer 7b.

(4) Two-Layer Resin Cover Portion

In the aspect shown in FIGS. 1 and 2, the resin cover portion 7 is constituted by the first cover layer 7a and the second cover layer 7b. The first cover layer 7a and the second cover layer 7b are constituted by mutually different resin materials.

The first cover layer 7a is provided so as to come into contact with the surface of the terminal fitting 5. Although there are no particular limitations on the specific shape and covering portion of the first cover layer 7a, in the illustrated aspect, the first cover layer 7a is formed so as to extend from the overall leading end of the resin cover portion 7 and occupy a portion of the resin cover portion 7 in the lengthwise direction, and covers all of the surfaces of the terminal fitting 5 except the bottom surface. The rear end portion of the first cover layer 7a is located at an intermediate portion of the second barrel portion 53, and the first cover layer 7a is not in contact with the insulation covering 4 of the electrical wire 2.

The second cover layer 7b is provided so as to come into contact with the first cover layer 7a and the insulation covering 4 of the electrical wire 2. Although there are no particular limitations on the specific shape and covering portion of the second cover layer 7b either, in the illustrated aspect, the second cover layer 7b covers a range in the lengthwise direction that extends from a position rearward of the front edge of the first cover layer 7a to the overall rear end of the resin cover portion 7 on the rear side of the leading end of the insulation covering 4. In other words, the front side portion of the second cover layer 7b comes into contact with the outer surface of the first cover layer 7a, and the rear side portion comes into contact with the surface of the insulation covering 4. At the position of the terminal fitting 5, the second cover layer 7b covers all of the surfaces of the terminal fitting 5 except the bottom surface in the circumferential direction, and at the position of the electrical wire 2, the second cover layer 7b completely surrounds the electrical wire 2 in the circumferential direction. Also, the second cover layer 7b covers all of the surfaces of the first cover layer 7a except the front end region.

The adhesion strength between the first cover layer 7a and the terminal fitting 5 is 1.0 MPa or higher. This adhesion strength is preferably 1.5 MPa or higher, or further preferably 1.8 MPa or higher. Also, it is preferable that a polar functional group contained in the resin material that constitutes the first cover layer 7a has an interaction, such as chemical bond formation, with a hydroxyl group at the surface of the terminal fitting 5.

The adhesion strength between the second cover layer 7b and the insulation covering 4 is 0.5 MPa or higher. It is further preferable that this adhesion strength is 0.7 MPa or higher. Also, it is preferable that fusion has occurred between the second cover layer 7b and the insulation covering 4. It is preferable that the adhesion strength between the first cover layer 7a and the terminal fitting 5 is higher than the adhesion strength between the second cover layer 7b and the insulation covering 4, and in one example of a preferable aspect, the adhesion strength between the first cover layer 7a and the terminal fitting 5 is a factor of 1.3 or higher, or further 2.0 or higher, of the adhesion strength between the second cover layer 7b and the insulation covering 4.

Due to the resin cover portion 7 being constituted by the first cover layer 7a and the second cover layer 7b, the constituent materials of the resin cover portion 7 can be selected with more freedom than in the case of being constituted by a single layer. By selecting for the first cover layer 7a a material that has a high adhesion with the metal material that constitutes the terminal fitting 5, and selecting for the second cover layer 7b a material that has a high adhesion with the resin material that constitutes the insulation covering 4, the resin cover portion 7 can suppress the intrusion of a corrosion factor through both the interface of contact with the terminal fitting 5 and the interface of contact with the insulation covering 4, and can thus achieve high corrosion resistance. Furthermore, the high corrosion resistance is likely to be maintained even after temperature cycles.

Furthermore, in the resin cover portion 7, it is preferable that the tensile shear adhesion strength between the first cover layer 7a and the second cover layer 7b is 1.0 MPa or higher. Accordingly, strong adhesion is achieved at the interface between the first cover layer 7a and the second cover layer 7b. As a result, the intrusion of a corrosion factor can be effectively prevented at not only the interfaces between the resin cover portion 7 and the terminal fitting 5 and insulation covering 4, but also at the interface between the two cover layers 7a and 7b that constitute the resin cover portion 7, and high corrosion resistance can be achieved for the entirety of the resin cover portion 7. When the resin cover portion 7 is subjected to temperature cycles, detachment can also be suppressed at the interface between the first cover layer 7a and the second cover layer 7b, thus making it more likely to maintain high corrosion resistance over an extended period of time. The adhesion strength between the first cover layer 7a and the second cover layer 7b is preferably 1.3 MPa or higher, or particularly preferably 2.0 MPa or higher.

If the adhesion strength between the second cover layer 7b and the insulation covering 4 and the adhesion strength between the first cover layer 7a and the second cover layer 7b are as described above, various combinations of types of resin envisioned for use as the first cover layer 7a, the second cover layer 7b, and the insulation covering 4 can be used to effectively suppress detachment at the interfaces caused by differences in expansion and contraction in response to temperature changes. Particularly from the viewpoint of reliably suppressing detachment, it is preferable that the ratio of the expansion coefficients of the second cover layer 7b and the insulation covering 4 is set such that the expansion coefficient of one of them is a factor of 3 times or less of the expansion coefficient of the other one, and that the ratio of the expansion coefficients of the first cover layer 7a and the second cover layer 7b is set such that the expansion coefficient of one of them is a factor of 5 times or less of the expansion coefficient of the other one.

Although there are no particular limitations on the specific resin material that constitutes the first cover layer 7a, it has a high polymer material as a main component. Various types of additives may be added to the high polymer material as necessary. A thermoplastic elastomer is one example of a favorable high polymer material that exhibits a high adhesion with the metal material that constitutes the terminal fitting 5, which is a tin-plated surface for example. A thermoplastic elastomer normally has a hard segment and a soft segment, and due to having a soft segment, has a high adhesion with the metal surface of the terminal fitting 5, which is a tin-plated surface for example.

Specific examples of the thermoplastic elastomer that constitutes the first cover layer 7a include a polyester elastomer whose hard segment is made up of polyester units, a polyamide elastomer whose hard segment is made up of polyamide segments, and a polyurethane elastomer whose hard segment is made up of polyurethane segments.

Among the above-described examples of thermoplastic elastomers, at least either a polyester elastomer and a polyurethane elastomer are favorable, and a polyester elastomer is particularly favorable. Polyester elastomers and polyurethane elastomers (polyester elastomers in particular) exhibit a high adhesion with the surface of the terminal fitting 5, which is made of a tin-plated copper alloy or the like.

It is preferable that the soft segment that constitutes the thermoplastic elastomer has a polar functional group on a side chain. Examples of polar functional groups include an ester group, an amide group, a hydroxyl group, an amino group, and a carboxyl group. Due to having a polar functional group, the soft segment can have an interaction with the surface of the terminal fitting 5, such as forming a chemical bond with a hydroxyl group at the metal surface, via the polar functional group, thus making it possible to improve the adhesion of the first cover layer 7a to the surface of the terminal fitting 5.

Even in the case where the polar functional group such as an ester group, an amide group, a hydroxyl group, an amino group, and a carboxyl group is not contained in the high polymer material such as a thermoplastic elastomer, but rather is contained in an additive included in the high polymer material, the adhesion strength of the first cover layer 7a with the surface of the terminal fitting 5 can be increased through an interaction between the polar functional group and the surface of the terminal fitting 5. One example of such an additive is an adhesive. The adhesive gradually effuses from the first cover layer 7a to the interface with the metal material that constitutes the terminal fitting 5, and a chemical bond is formed between the polar functional group and the hydroxyl group at the surface of the terminal fitting 5. A resin-based adhesive that has a high polarity and a low melting point, such as a polyamide adhesive or a polyester adhesive, can be favorably used as the adhesive.

The adhesion strength of the first cover layer 7a with the surface of the terminal fitting 5 and the second cover layer 7b can be adjusted using the type and content amount of the high polymer material and the additives that constitute the first cover layer 7a. In the case where the high polymer material is a thermoplastic elastomer, it is also possible to adjust the adhesion strength using the type of hard segment and soft segment that constitute the thermoplastic elastomer, the presence/absence and type of polar functional group, the ratio of the hard segment and the soft segment, the degree of polymerization, and the like. The adhesion strength with the surface of the terminal fitting 5 can also be adjusted using conditions that are used when forming the first cover layer 7a, as will be described later.

Although there are also no particular limitations on the specific resin material that constitutes the second cover layer 7b, it has a high polymer material as a main component. Various types of additives may be added to the high polymer material as necessary. In order to exhibit high adhesion with the resin material (e.g., PP or PVC) that constitutes the insulation covering 4 of the electrical wire 2, it is preferable that the high polymer material includes at least one type of material among polyester resin, polycarbonate resin, and polyphenylene sulfide resin, and it is particularly preferable to include at least one of polyester resin and polycarbonate resin.

Polyester resin in particular has a high adhesion with the insulation covering 4, which is made of PP, PVC, or the like, and therefore can be favorably used as the high polymer material that constitutes the second cover layer 7b. Examples of polyester resins include polybutylene terephthalate (PBT) resin and polyethylene terephthalate (PET) resin, and out of these two, PBT resin is favorable. If the first cover layer 7a is made of a thermoplastic elastomer, the second cover layer 7b that includes a polyester elastomer is likely to exhibit a high adhesion strength with the first cover layer 7a. In particular, in the case where the first cover layer 7a includes a polyester elastomer whose hard segment has a polyester unit, if the second cover layer 7b includes a polyester resin, then the first cover layer 7a and the second cover layer 7b both contain a polyester structure, and a particularly high adhesion strength is likely to be obtained between the first cover layer 7a and the second cover layer 7b.

The adhesion strength of the second cover layer 7b with the insulation covering 4 and the first cover layer 7a can be adjusted using the type and degree of polymerization of the high polymer material that constitutes the second cover layer 7b and the type and content amount of additives. Also, the adhesion strength with the surface of the insulation covering 4 and the first cover layer 7a can be adjusted using conditions that are used when forming the second cover layer 7b, as will be described later.

As a method for manufacturing the terminal-equipped electrical wire 1, it is sufficient that first the barrel portions 52 and 53 of the terminal fitting 5 are crimped and fixed to the end of the electrical wire 2 where the insulation covering 4 has been peeled away. Then the first cover layer 7a is formed, through injection molding, application, or the like, at a predetermined location on the electrical connection portion 6, which is the crimp portion that connects the electrical wire conductor 3 and the terminal fitting 5. Thereafter, the second cover layer 7b is similarly formed at a predetermined location through injection molding, application, or the like. Note that in the case where the first cover layer 7a is formed on only the surface of the terminal fitting 5, the first cover layer 7a may be formed at a predetermined location on the surface of the terminal fitting 5 before the electrical wire 2 is connected to the terminal fitting 5.

The adhesion strengths at the interfaces between the first cover layer 7a and the terminal fitting 5, between the second cover layer 7b and the insulation covering 4, and between the first cover layer 7a and the second cover layer 7b can be adjusted using conditions that are used when forming the first cover layer 7a and the second cover layer 7b. In the case where the first cover layer 7a and the second cover layer 7b are formed through injection molding, it is sufficient to adjust various parameters related to injection molding. For example, the adhesion strength at the interface can be increased by increasing the resin temperature, mold temperature, and holding pressure when performing injection molding. Note that the higher the resin temperature is, the higher the adhesion strength at the interfaces is, but it is preferable that the temperature is not high enough to cause thermal degeneration in the resin material used in injection molding and the materials that come into contact with that resin material.

In particular, after forming the first cover layer 7a, when then forming the second cover layer 7b, if the temperature of the resin material is set greater than or equal to the melting point of the polymer that constitutes the insulation covering 4, the surface layer portion of the insulation covering 4 melts due to the heat of the resin material and then hardens along with the second cover layer 7b, thus forming a fused layer at the interface between the insulation covering 4 and the second cover layer 7b, and achieving strong adhesion. If the melting point of the polymer that constitutes the second cover layer 7b is higher than the melting point of the polymer that constitutes the insulation covering 4, the melted resin that is hotter than the melting point of the insulation covering 4 comes into contact with the insulation covering 4 and is likely to cause the surface layer portion of the insulation covering 4 to melt during formation of the second cover layer 7b, and therefore strong adhesion is likely to be achieved due to the formation of the fused layer.

Similarly, if the temperature of the resin material that constitutes the second cover layer 7b is set greater than or equal to the melting point of the polymer that constitutes the first cover layer 7a, the surface layer portion of the first cover layer 7a melts due to the heat of the resin material and then hardens along with the second cover layer 7b, thus forming a fused layer at the interface between the first cover layer 7a and the second cover layer 7b, and achieving strong adhesion. If the melting point of the polymer that constitutes the second cover layer 7b is higher than the melting point of the polymer that constitutes the first cover layer 7a, the melted resin that is hotter than the melting point of the first cover layer 7a comes into contact with the first cover layer 7a and is likely to cause the surface layer portion of the first cover layer 7a to melt during formation of the second cover layer 7b, and therefore strong adhesion is likely to be achieved due to the formation of the fused layer. Polyester resin, polycarbonate resin, and polyphenylene sulfide resin, which are favorably used as the second cover layer 7b, often have a higher melting point than the thermoplastic elastomer that is favorably used as the first cover layer 7a.

Wire Harness

A wire harness according to an embodiment of the present disclosure includes multiple electrical wires, including the terminal-equipped electrical wire 1 according to the above-described embodiment of the present disclosure. All of the electrical wires included in the wire harness may be the terminal-equipped electrical wire 1 according to the above embodiment of the present disclosure, or only a portion thereof may be the terminal-equipped electrical wire 1 according to the above embodiment of the present disclosure.

Figure 5:
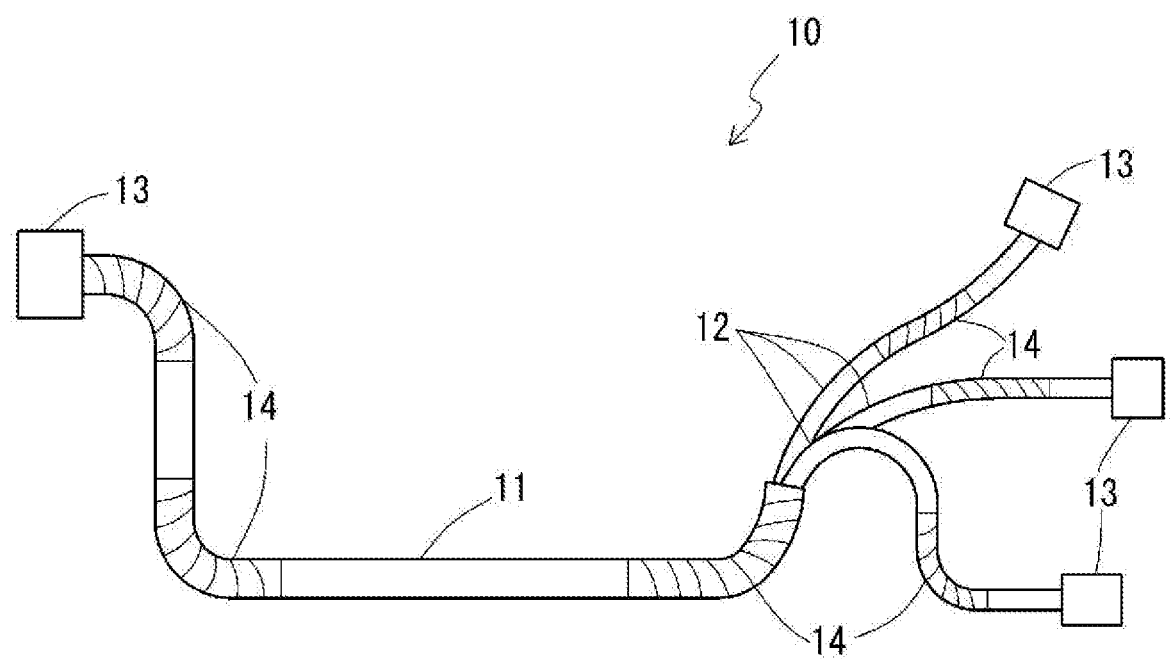
FIG. 5 is a side view of a wire harness according to an embodiment of the present disclosure.

FIG. 5 shows an example of a wire harness. A wire harness 10 has a configuration in which three branch harness portions 12 branch out from the leading end portion of a main harness portion 11. Multiple terminal-equipped electrical wires are bundled together in the main harness portion 11. Those terminal-equipped electrical wires are divided into three groups, and the electrical wires in each group are bundled together in a corresponding branch harness 12. In the main harness portion 11 and the branch harness portions 12, adhesive tape 14 is used to bundle together the terminal-equipped electrical wires and hold a curved shape. The base end portion of the main harness portion 11 and the leading end portions of the branch harness portions 12 are each provided with a connector 13. The connectors 13 house terminal fittings that are attached to the ends of the terminal-equipped electrical wires.

At least one of the terminal-equipped electrical wires that constitute the wire harness 10 is the terminal-equipped electrical wire 1 according to the above embodiment of the present disclosure. The terminal fitting 5 and the electrical connection portion 6 covered by the resin cover portion 7 in that terminal-equipped electrical wire 1 are housed in a connector housing, thus constituting the connector 13.

WORKING EXAMPLES

The following describes working examples of the present disclosure and comparative examples. Note that the present disclosure is not intended to be limited by the following working examples.

1. Evaluation of Influence of Temperature Cycles on Corrosion Resistance

The relationship between the adhesion strengths at interfaces and the influence of temperature cycles on corrosion resistance was evaluated in the case where the resin cover portion is constituted by the first cover layer and the second cover layer.

A. Materials

The following resin materials were used to form the resin cover portion.

(1) First Cover Layer
Resin A1: polyester elastomer resin ("Hytrel HTD-741H" from Du Pont-Toray Co., Ltd.)
Resin A2: polyurethane elastomer resin ("Elastollan ET580" from BASF Japan Ltd.)
Resin A3: polyolefin elastomer resin ("Espolex 3675" from Sumitomo Chemical Co., Ltd.)
Resin A4: polyurethane elastomer resin ("S60D" from BASF Japan Ltd.)

(2) Second Cover Layer
Resin B1: polyester resin ("C7000NY" from Polyplastics Co., Ltd.)
Resin B2: polycarbonate resin ("11-4000" from Mitsubishi Chemical Corporation)
Resin B3: polypropylene resin ("Daicel PP PT3F1" from Daicel Polymer Ltd.)
Resin B4: nylon resin ("Amilan U121" from Toray Industries, Inc.)
Resin B5: polyphenylene sulfide resin ("FZ-2100" from DIC Corporation)

B. Adhesion Test

In order to evaluate the adhesion strength of the first cover layer to the surface of the terminal fitting, various resin materials for constituting the first cover layer were injection molded onto the surface of a tin-plated copper alloy plate serving as a model of the terminal fitting material. Also, in order to evaluate the adhesion strength of the second cover layer to the insulation covering, various resin materials for constituting the second cover layer were injection molded onto the surface of a PVC sheet serving as a model of the insulation covering. Furthermore, in order to evaluate the adhesion strength between the first cover layer and the second cover layer, various resin materials for constituting the first cover layer were injection molded onto the surface of a tin-plated copper alloy plate, and various resin materials for constituting the second cover layer were further injection molded onto the surface of the resin materials for constituting the first cover layer. Note that the conditions used when injection molding the resin materials were set so as to match the conditions for forming the first cover layer and the second cover layer in the terminal-equipped electrical wires according to the working examples and the comparative examples in the later-described corrosion resistance evaluation.

The adhesion strength was evaluated for each of the test samples that were produced. The adhesion strength was measured as the tensile shear adhesion strength by performing a shear adhesion test at room temperature in compliance with JIS K 6850.

C. Evaluation of Corrosion Resistance (1) Production of Samples

First, electrical wires were produced in order to evaluate the corrosion resistance of the terminal-equipped electrical wire. Specifically, 100 parts polyvinyl chloride (degree of polymerization 1300), 40 parts diisononyl phthalate serving as a plasticizer, 20 parts calcium bicarbonate serving as a filler, and 5 parts calcium zinc-based stabilizer serving as a stabilizer were mixed at 180° C. to produce a polyvinyl chloride composition. The obtained polyvinyl chloride composition was then formed by extrusion with a thickness of 0.28 mm around a conductor (cross-sectional area of 0.75 $mm^2$) constituted by an aluminum alloy stranded wire that is made up of seven aluminum alloy wires twisted together. An electrical wire (PVC electrical wire) was thus produced.

The end of the produced electrical wire was then peeled to exposed the electrical wire conductor, and then a female press-fit terminal fitting made of tin-plated bronze, which is commonly used in automobiles, was crimped around the end of the electrical wire.

Next, terminal-equipped electrical wires according to the working examples and the comparative examples were produced. Specifically, first cover layers were formed by injection molding with use of the materials shown in Table 1. Second cover layers were then further formed by injection molding. At this time, the portions covered by the first cover layer and the second cover layer are as shown in FIGS. 1 and 2. Also, the thickness of the first cover layer was 0.4 mm, and the thickness of the second cover layer was 0.4 mm. The conditions used in injection molding (resin temperature, mold temperature, injection pressure, holding pressure, and cooling time) were set so as to obtain the adhesion strengths shown in Table 1 at the interfaces between the materials.

(2) Post-Temperature Cycle Salt Water Spray Test

The terminal-equipped electrical wires produced according to the working examples and the comparative examples were subjected to a temperature cycle test in compliance with JIS C 60068-2-14. At this time, letting one cycle be a step of holding the terminal-equipped electrical wires at 125° C. for 30 minutes and then at −40° C. for 30 minutes, the temperature cycle test was performed for 1,000 cycles.

The samples that were subjected to 1,000 temperature cycles in the above-described temperature cycle test were then subjected to a salt water spray test in compliance with JIS Z 2371 in order to evaluate the corrosion resistance. Salt water was sprayed for 100 hours at room temperature, and then the resin cover portions were removed and the appearance of the electrical connection portions were visually observed. If corrosion products were not seen on the surface of the aluminum conductor, the grade "A" indicating high corrosion resistance was determined. If corrosion products were seen, the grade "B" indicating lower corrosion resistance was determined.

D. Test Results

Table 1 below shows the types of resin materials used for the first cover layer (first layer) and the second cover layer (second layer), as well as the results of measuring the adhesion strength between materials at the interfaces. It also shows evaluation results obtained in the corrosion resistance test performed by salt water spraying after the temperature cycles.

TABLE 1

|  |  | Working Example 1 | Working Example 2 | Working Example 3 | Working Example 4 | Comp. Example 1 | Comp. Example 2 | Comp. Example 3 | Comp. Example 4 | Comp. Example 5 | Comp. Example 6 |
|---|---|---|---|---|---|---|---|---|---|---|---|
| Constituent material | 1st layer | A1 | A2 | A1 | A2 | A2 | A3 | A3 | A3 | A2 | A4 |
|  | 2nd layer | B1 | B1 | B2 | B4 | B5 | B1 | B3 | B4 | B5 | B5 |
| Adhesion strength [MPa] | 1st layer - terminal fitting | 1.1 | 2.0 | 1.1 | 2.0 | 2.0 | 0.3 | 0.3 | 0.3 | 2.0 | 0.6 |
|  | 2nd layer - insulation covering | 0.8 | 0.8 | 0.6 | 0.6 | 0.3 | 0.8 | 0.0 | 0.6 | 0.3 | 0.3 |
|  | 1st layer - 2nd layer | 2.4 | 1.5 | 1.2 | 1.3 | 0.1 | 0.2 | 0.2 | 1.3 | 0.7 | 0.7 |
| Post-temperature cycle corrosion resistance test |  | A | A | A | A | B | B | B | B | B | B |

According to Table 1, in each of the working examples, the adhesion strength was 1.0 MPa at the interface between the first cover layer and the terminal fitting, 0.5 MPa or higher at the interface between the second cover layer and the insulation covering, and 1.0 MPa or higher at the interface between the first cover layer and the second cover layer, and furthermore, when the salt water spray corrosion resistance test was performed after the temperature cycles, high corrosion resistance results were obtained. This shows that due to the adhesion strength being maintained at a predetermined strength or higher at the interfaces, detachment was not likely to occur at the interfaces even after the temperature cycles.

On the other hand, in each of the comparative examples, the aforementioned predetermined adhesion strength value or higher was not obtained for at least one of the three interfaces. Specifically, in Comparative Examples 1 and 5, the predetermined adhesion strength value or higher was not obtained at the interface between the second cover layer and the insulation covering and between the first cover layer and the second cover layer, in Comparative Example 2, it was not obtained at the interface between the first cover layer and the terminal fitting and between the first cover layer and the second cover layer, in Comparative Examples 3 and 6, it was not obtained any of the three interfaces, and in Comparative Example 4, it was not obtained at the interface between the first cover layer and the terminal fitting. Accordingly, in each of the comparative examples as well, a low corrosion resistance result was obtained in the salt water spray corrosion resistance test performed after the temperature cycles. This indicates that due to the adhesion strength being insufficient at at least one interface, after the temperature cycles, detachment occurred at the interface due to thermal expansion or thermal contraction of the materials, and gaps that allowed the intrusion of salt water were formed.

2. Observation of Interface State

Next, the state of the interface between the second cover layer and the insulation covering, where resin materials are in contact with each other, and the state of the interface between the first cover layer and the second cover layer were examined through cross-sectional surface microscopy.

A. Production of Samples

As a sample corresponding to the adhesion portion between the second cover layer and the insulation covering, Sample 1 was obtained by injection molding PBT (the resin B1) on the surface of a PVC sheet. Also, as a sample corresponding to the adhesion portion between the first cover layer and the second cover layer, Sample 2 was obtained by injection molding a polyester elastomer resin (the resin A1) on the surface of a tin-plated copper alloy plate, and then further injection molding PBT (the resin B1) on the polyester elastomer resin. The conditions used during the injection molding processes are shown in Table 2 below. Note that the conditions used in the injection molding of Sample 1 correspond to Working Example 1 in the corrosion resistance test.

TABLE 2

|  | Sample 1 | Sample 2 | |
|---|---|---|---|
|  |  | 1st layer | 2nd layer |
| Resin temperature [° C.] | 250-260 | 260 | 240 |
| Mold temperature [° C.] | 40-60 | 40 | 40 |
| Injection pressure [MPa] | 20-100 | 70 | 40 |
| Holding pressure [MPa] | ≥10 | 10 | 10 |
| Cooling time [s] | ≥5 | 10 | 30 |

B. Microscopy

Thin cross-section samples were obtained from Samples 1 and 2, and the thin samples were observed using a transmission electron microscope (TEM). At this time, the acceleration voltage was 100 kV. The magnification factors were 8,000 and 40,000.

C. Observation Results

Figure 3A:
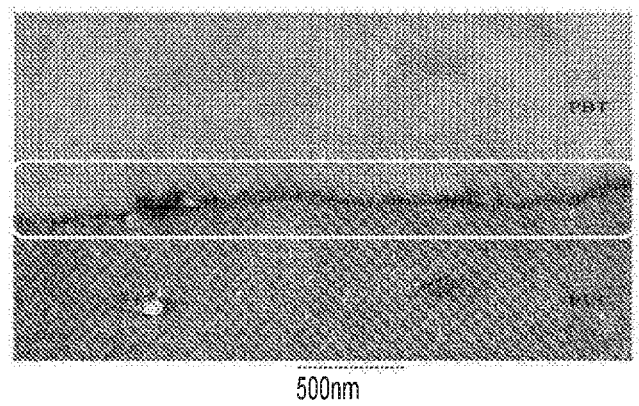
FIGS. 3A and 3B show transmission electron microscope (TEM) images that show the interface between the material constituting a second cover layer and the material constituting an insulation covering, where
Figure 3B:
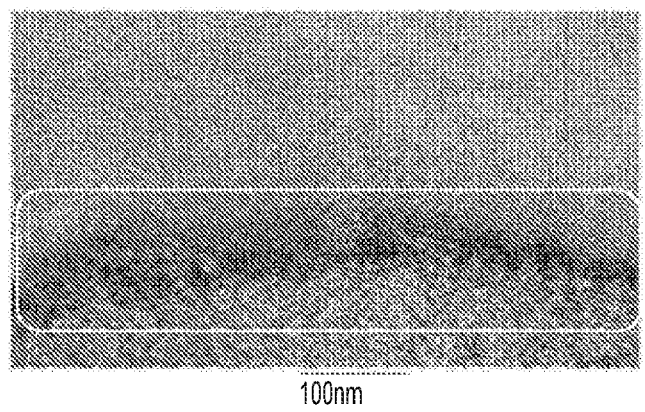

FIG. 3 shows TEM images of the PVC/PBT interface of Sample 1. Here, (a) is an 8,000 magnification image, and (b) is a 40,000 magnification image. The relative bright gray layer on the upper side of the images corresponds to PBT, and the relatively dark gray layer on the lower side corresponds to PVC. As shown by the portion surrounded by a white line in the images, a layer that is darker than the PBT layer and the PVC layer, has a thickness of 100 nm or less, and has a smooth relief structure was observed at the interface between the PVC and the PBT. It can be construed that this layer is a fused layer that is formed by the PBT and the PVC both melting and diffusing into each other, and then hardening. Also, it can be understood that the layer fused with the PVC layer and the layer fused with the PBT layer are in tight contact with each other, and that strong adhesion is achieved at the interface between the PVC and the PBT via the fused layers.

Figure 4A:
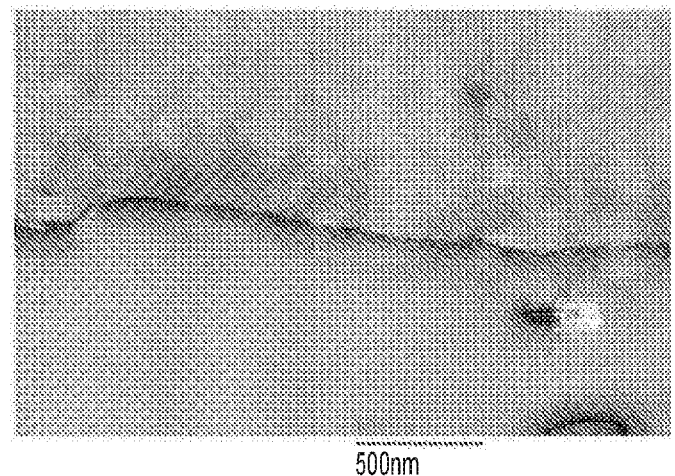
FIGS. 4A and 4B show transmission electron microscope (TEM) images that show the interface between the material constituting the first cover layer and the material constituting the second cover layer, where
Figure 4B:
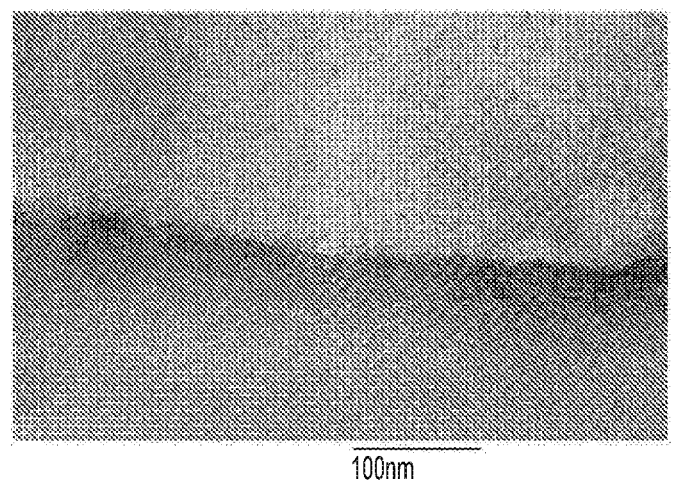

FIG. 4 shows TEM images of the elastomer/PBT interface of Sample 2. Here, (a) is an 8,000 magnification image, and (b) is a 40,000 magnification image. The layer on the upper side of the images corresponds to the PBT, and the layer on the lower side corresponds to the elastomer. In Sample 2 as well, it can be seen that a fused layer that appears similar to the fused layer in Sample 1 is formed at the interface between the elastomer and the PBT, and strong adhesion has been achieved via the fused layer.

3. Evaluation of Relationship Between Resin Cover Layer Formation Conditions and Adhesion Strength The relationship that the adhesion strength of the resin cover layer that constitutes the resin cover portion has with the conditions used when forming the resin cover layer was evaluated.

A. Production of Samples

Samples were produced by injection molding PBT (the resin B1) on the surface of PVC sheets. When performing this injection molding, multiple samples were produced by changing the conditions regarding the resin temperature, the mold temperature, the holding pressure, and the adhesion strength, as shown in Table 3. For all of the samples, the injection pressure was 120 MPa, and the cooling time was 10 seconds. Also, the thickness of the PBT layer was 2.0 mm.

B. Measurement of Adhesion Strength

Similarly to the adhesion test described above, the tensile shear adhesion strength of the produced samples was measured by performing a shear adhesion test at room temperature in compliance with JIS K 6850.

C. Test Results

Table 3 below shows PBT resin molding conditions and the measured adhesion strengths.

TABLE 3

|  | Condition 1 | Condition 2 | Condition 3 | Condition 4 | Condition 5 | Condition 6 | Condition 7 |
| --- | --- | --- | --- | --- | --- | --- | --- |
| Resin temperature [° C.] | 240 | 250 | 260 | 250 | 250 | 250 | 250 |
| Mold temperature [° C.] | 40 | 40 | 40 | 30 | 50 | 40 | 40 |
| Holding pressure [MPa] | 10 | 10 | 10 | 10 | 10 | 0 | 5 |
| Adhesion strength [MPa] | 1.0 | 1.2 | 1.6 | 0.5 | 1.2 | 0.0 | 0.7 |

According to Table 3, even when using the same resin material, the adhesion strength changes a large amount according to the conditions that are used in injection molding. The resin temperature is different in Conditions 1 to 3, and the higher the resin temperature is, the higher the adhesion strength is. This is thought to be because the higher the resin temperature is, the more easily the fused layer is formed at the interface with the PVC by the heat of the melted PBT. However, in Condition 3, it is seen that the resin temperature was too high, and therefore degradation occurred in the resin cover portion, and it is preferable that the resin temperature is kept around 250° C. as in condition 2.

The mold temperature was different in Conditions 2, 4, and 5. When the mold temperature was increased from 30° C. in Condition 4 to 40° C. in Condition 2, the adhesion strength increased. This is construed to be because the mold temperature is sufficiently high, and the injected PBT reaches the surface of the PVC while maintaining a sufficiently hot state, thus making it possible to form the fused layer. However, even if the mold temperature is further raised to 50° C. in Condition 5, the adhesion strength does not improve. This is thought to be because the effect of allowing the PBT to reach the PVC surface while remaining hot has reached a saturation point.

The holding pressure is different in Conditions 2, 6, and 7, and the higher the holding pressure is, the higher the adhesion strength is. This is thought to be because the higher the holding pressure is, the hardening of the resin material advances while the PBT is pressed against the PVC with a higher pressure, and the higher the adhesion is at the interface. In condition 6 in which no holding pressure was applied, there was substantially no adhesion between the PBT and the PVC.

Among the various conditions employed in this test, it can be said that Condition 2 is the most preferable from the viewpoint of allowing the second cover layer to strongly adhere to the insulation covering while also preventing degeneration in the constituent materials. Condition 2 corresponds to Working Example 1 in the above-described corrosion resistance test and the Sample 2 formation conditions in the above-described microscopy.

It can be seen from the above-described results that the adhesion strength at the interface between the second cover layer and the insulation covering can be widely controlled with use of conditions used when forming the second cover layer by injection molding. Similarly, it is thought to be possible to also control the adhesion strength at the interface between the first cover layer and the second cover layer, which is an interface of contact between resin materials, with use of conditions used when forming the second cover layer by injection molding. Moreover, at the interface between the first cover layer and the terminal fitting as well, although a fused layer is not formed as in the case of an interface between resin material, it is thought to be possible to control the adhesion strength to a certain extent with use of conditions used when forming the first cover layer by injection molding.

Although embodiments of the present disclosure have been described in detail above, the present disclosure is not intended to be limited in any way to the above embodiments, and various changes can be made without departing from the gist of the present disclosure.

The invention claimed is:

1. A terminal-equipped electrical wire comprising:
a terminal fitting; an electrical wire that includes a conductor surrounded by an insulation covering and is electrically connected to the terminal fitting in an electrical connection; and a resin cover that is made of a resin material and covers the electrical connection, wherein the resin cover is in contact with the terminal fitting and the insulation covering, a tensile shear adhesion strength between the resin cover and the terminal fitting is 1.0 MPa or higher, and a tensile shear adhesion strength between the resin cover and the insulation covering is 0.5 MPa or higher, wherein the resin cover includes a first cover layer that is provided in contact with a surface of the terminal fitting, and a second cover layer that is provided in contact with the first cover layer and the insulation covering, and a tensile shear adhesion strength between the first cover layer and the terminal fitting is 1.0 MPa or higher, a tensile shear adhesion strength between the second cover layer and the insulation covering is 0.5 MPa or higher, and a tensile shear adhesion strength between the first cover layer and the second cover layer is 1.0 MPa or higher, and wherein a resin material that forms the second cover layer has a higher melting point than a resin material that forms the first cover layer.

2. The terminal-equipped electrical wire according to claim 1, wherein fusion has occurred at an interface between the resin cover and the insulation covering.

3. The terminal-equipped electrical wire according to claim 1, wherein fusion has occurred at an interface between the first cover layer and the second cover layer.

4. The terminal-equipped electrical wire according to claim 1, wherein the first cover layer contains at least one of a polyester elastomer and a polyurethane elastomer.

5. The terminal-equipped electrical wire according to claim 1, wherein the second cover layer contains at least one of a polyester resin, a polycarbonate resin, and a polyphenylene sulfide resin.

6. A wire harness including the terminal-equipped electrical wire according to claim 1.

* * * * *